(12) United States Patent
Cook et al.

(10) Patent No.: US 6,409,804 B1
(45) Date of Patent: Jun. 25, 2002

(54) SEPARATOR TANK ASSEMBLY FOR A FLUID COMPRESSOR

(75) Inventors: Roger Cook, Cheshire; N. Philip Lowe, Lancashire, both of (GB)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/672,003

(22) Filed: Sep. 29, 2000

(51) Int. Cl.$^7$ .......................... B01D 46/00; B01D 45/18
(52) U.S. Cl. ..................... 95/273; 55/423; 55/424; 55/428; 55/DIG. 5; 55/DIG. 17
(58) Field of Search ................... 55/392, 423, 424, 55/425, 428, 490, 492, 495, 501, 502, 510, DIG. 17, DIG. 5; 418/88, DIG. 1; 137/511; 95/273

(56) References Cited

U.S. PATENT DOCUMENTS

| | | | |
|---|---|---|---|
| 2,934,166 A | * 4/1960 | Rossum | 55/526 |
| 3,402,529 A | * 9/1968 | Frantz | 55/510 |
| 3,715,870 A | 2/1973 | Guzick | 55/466 |
| 3,796,025 A | 3/1974 | Kasten | 55/316 |
| 3,926,205 A | * 12/1975 | Gourlet | 137/533.17 |
| 4,057,502 A | 11/1977 | Crumrine et al. | 210/440 |
| 4,209,311 A | * 6/1980 | Deeg et al. | 55/492 |
| 4,278,455 A | 7/1981 | Nardi | 55/337 |
| 4,385,913 A | 5/1983 | Lane | 55/350 |
| 4,487,618 A | 12/1984 | Mann | 55/323 |
| 4,504,081 A | 3/1985 | Shimizu et al. | 280/714 |
| 4,632,682 A | 12/1986 | Erdmannsdörfer | 55/498 |
| 4,775,304 A | 10/1988 | Bein | 418/99 |
| 4,780,204 A | 10/1988 | Rasmussen | 210/314 |
| 4,792,397 A | 12/1988 | Rasmussen | 210/314 |
| 4,950,317 A | 8/1990 | Dottermans | 55/337 |
| 4,969,994 A | * 11/1990 | Misgen et al. | 55/495 |
| 5,173,186 A | 12/1992 | Spafford et al. | 210/455 |
| 5,399,264 A | 3/1995 | Pulek et al. | 210/450 |
| 5,587,071 A | 12/1996 | Belden | 210/232 |
| 5,685,896 A | 11/1997 | Castle et al. | 96/130 |
| 5,899,667 A | 5/1999 | Greer | 417/53 |

* cited by examiner

*Primary Examiner*—Duane Smith
*Assistant Examiner*—Jason M. Greene
(74) *Attorney, Agent, or Firm*—Michael Best & Friedrich LLP

(57) ABSTRACT

A separator tank assembly for use in a fluid compression system includes a separator element having a base, a support element mounted to the separator element, and a scavenge tube. The scavenge tube has a first end and a second end. The scavenge tube is fixed to the support element so that the first end of the scavenge tube is located at a predetermined position relative to the base of the separator element. The separator tank assembly also includes a tank housing having an outer flange at a top end thereof. The tank housing is dimensioned to receive the separator element. The separator tank assembly further includes a tank cover to attach to the outer flange of the tank housing. The tank cover has a cover orifice, and the separator tank assembly includes an adapter extending through the cover orifice. The adapter has a first section to connect to the second end of the scavenge tube and a second section to connect to a line component of the fluid compression system.

26 Claims, 3 Drawing Sheets

SEPARATOR TANK ASSEMBLY FOR A FLUID COMPRESSOR

BACKGROUND

The present invention relates to a separator tank assembly for a fluid compressor. More specifically, the present invention relates to a separator tank assembly used to scavenge lubricant from a separator element of a fluid compressor.

Conventional fluid compressors, such as a screw compressors, can become flooded with lubricant used to lubricate the component parts of the compressor. The lubricant, usually oil, frequently and undesirably leaks past the seals in the fluid compressor system and mixes with the compressed fluid stream. To remove the lubricant from the fluid stream, the compressed fluid/lubricant mixture is directed into a separator element of a separator tank, where the lubricant is separated out from the compressed fluid stream.

Separator elements typically have a perforated outer sleeve, a perforated inner sleeve, and a spun metal top flange. A separating media is sandwiched between the perforated outer sleeve and the perforated inner sleeve. An end cap or cover closes the discharge end of the whole assembly. When lubricant-laden fluid, such as oil-laden air, passes from outside the separator element assembly to inside the separator element assembly, the separating media entraps the droplets of lubricant in the fluid, and the compressed fluid exits the separator element assembly in a much less contaminated condition. In an air compressor, for example, treated air typically is 3 parts per million by weight. Meanwhile, the lubricant that has been separated from the compressed fluid drains down the inside and outside of the separator element. The lubricant that drains down the outside of the element simply runs back into the lubricant sump. The lubricant that drains downs the inside of the separator element has to be removed from the element; otherwise, the efficiency of separating media to remove lubricant from the fluid stream is affected.

The conventional way to remove lubricant from inside the separator element is to run an independent scavenge tube into the center of the separator element assembly. The scavenge tube is inserted through the end cap of the assembly and piped to a low pressure part of the lubricant/fluid circuit, usually before the compression phase. The scavenge tube ideally extends to the bottom of the separator element, on the inside of the element, and draws off the excess lubricant before it saturates the separating media and causes lubricant carryover.

Positioning the scavenge tube through the cover of the separator element assembly can be difficult. If the scavenge tube is too long, it can puncture the bottom of the separator element. If the scavenge tube is too short, it will not be effective to remove lubricant.

SUMMARY OF THE INVENTION

The invention alleviates the disadvantages present in conventional fluid compression systems by providing a separator element for use in a separator tank that has a scavenge tube integrally formed with the separator element. The separator element comprises a housing having a base and a sidewall structure. The housing preferably comprises a perforated outer sleeve, a perforated inner sleeve, and a separating media located between the inner and the outer sleeves. The separator element also comprises a support element permanently mounted to the housing. The separator element further comprises a scavenge tube fixed to the support element so that one end of the scavenge tube is located at a predetermined position relative to the base of the housing. Accordingly, once the separator element has been assembled, with the scavenge tube forming a component part of the separator element, there is no need for independent adjustment of the scavenge tube relative to the base of the separator element and, hence, no risk of making the scavenge tube too long or too short relative to the base.

In another aspect of the invention, the housing has a longitudinal central axis, and the support element fixes the scavenge element along the longitudinal central axis. In this manner, the scavenge tube is centralized in the separator element for maximum lubricant-scavenge efficiency. The support element can have a central portion and at least two arms extending from the central portion and attaching to the housing. The housing, in turn, can have a mounting section that extends inward from an inner surface thereof, so that at least a portion of the arms of the support element can be mounted to the mounting section. In this regard, the mounting section can form an annular shelf in the interior of the housing, perpendicular to the longitudinal central axis of the housing. The annular shelf can have a top surface, facing away from the base of the housing, and the portion of each of the at least two arms can be mounted to the top surface of the annular shelf.

A separator tank assembly for use in a fluid compression system in accordance with the invention comprises a separator element having a base, a support element mounted to the separator element, and a scavenge tube. The scavenge tube is fixed to the support element so that a first end of the scavenge tube is located at a predetermined position relative to the base of the separator element. The separator tank assembly also comprises a tank housing having an outer flange at a top end thereof. The tank housing is dimensioned to receive the separator element. The separator tank assembly further comprises a tank cover to attach to the outer flange of the tank housing. The tank cover has a cover orifice therethrough. The assembly additionally comprises an adapter extending through the cover orifice. The adapter has a first section to connect to a second end of the scavenge tube and a second section to connect to a line component of the fluid compression system.

The first section of the adapter can include a seal element, such as an O-ring, to engage an outer surface the scavenge tube. The adapter has an adapter orifice extending therethrough that communicates with a flow passage in the scavenge tube when the adapter is attached to the scavenge tube. The adapter also can include a valve positioned in the adapter orifice between the first section and the second section to restrict fluid flow in a direction from the second section to the first section. In addition, the second section of the adapter can include a fitting in the adapter orifice to restrict fluid flow in a direction from the first section to the second section through the orifice. This fitting can be press fit in the adapter orifice. Alternatively, the second section of the adapter can be machined to form the fitting. The fitting can have a tapered channel that tapers toward the first section of the adapter.

To mount the separator element in the separator tank housing, the separator element includes a flange extending out from a top end thereof opposite the base. This flange is positioned between the outer flange of the tank housing and the tank cover.

In still another aspect of the invention, an adapter assembly for placement in a cover of a separator tank of a fluid compression system comprises a first section to connect to a scavenge element of the separator tank, a second section to connect to a line component of the fluid compression system, and a an adapter orifice for fluid flow therethrough. A seal element is positioned in the first section to engage an outer surface the scavenge element. A valve is positioned in the adapter orifice between the first section and the second section to restrict fluid flow in a direction from the second section to the first section. A fitting is positioned in the adapter orifice in the second section of the adapter to restrict fluid flow through the adapter orifice.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Figure 1:
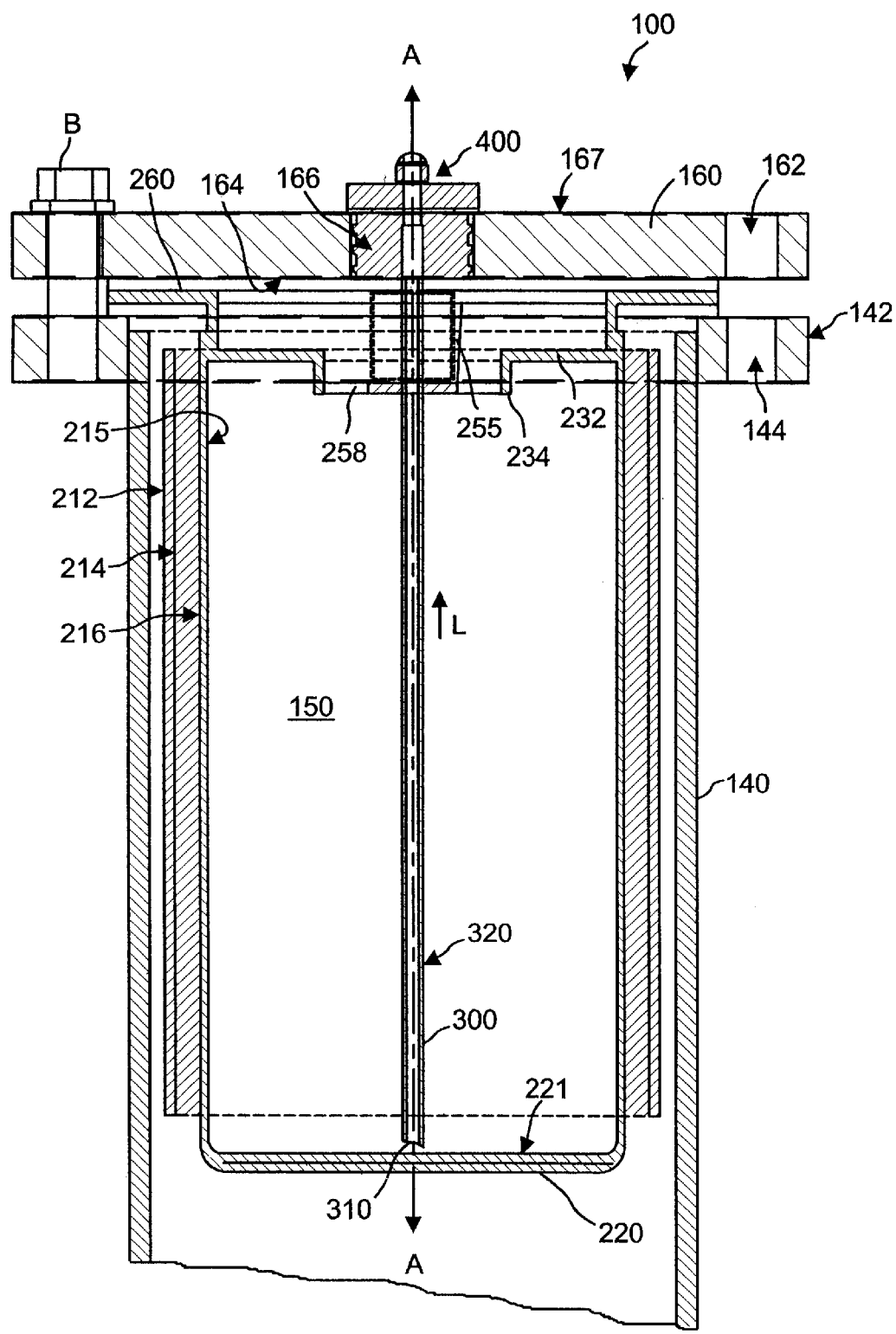
FIG. 1 is a side elevation view, in cross section, of a separator tank assembly, taken along section line 1—1 in FIG. 2, in accordance with the invention.

Referring to the drawings, wherein identical numerals indicate like parts, and particularly to FIG. 1, there will be seen a separator tank assembly 100 for use in a fluid compression system. The separator tank assembly 100 of the present invention separates lubricant, such as oil, from compressed fluid so that substantially lubricant-free compressed fluid is supplied to an object of interest, such as an air tool, through the separator tank discharge port (not shown) The separator tank assembly 100 generally comprises a separator element 200, a tank housing 140, a tank cover 160, and an adapter 400, as will be described in detail below.

Figure 2:
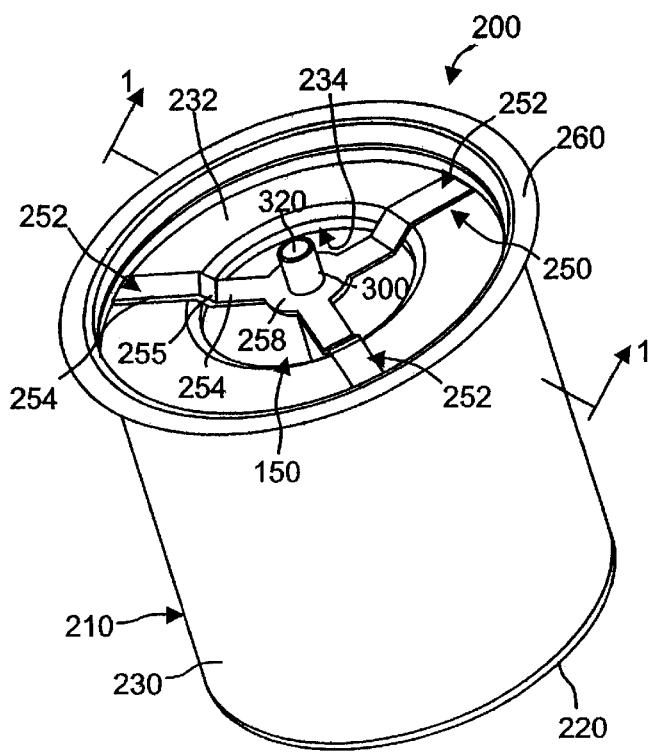
FIG. 2 is a perspective view of a separator element in accordance with the invention.

The tank assembly 100 includes a scavenge tube 300 formed as an integral unit with the separator element 200 (see FIG. 2). The scavenge tube 300, which is fixed to the separator element 200 by a support element 250, preferably is positioned along the longitudinal central axis of the separator element 200. One end 310 of the scavenge tube 300 is located at an optimum position relative to the base 220 of the separator element 200 to efficiently pipe away lubricant separated from compressed fluid by the separator element 200. The separator element (with scavenge tube) may be inserted into the separator tank housing 140, and the separator tank cover 160 then can be mounted to the separator tank housing 140. Because the scavenge tube 300 is incorporated into the structure of the separator element 200, during assembly of the cover 160 to the housing 140, no independent adjustment of the scavenge tube 300 is necessary to ensure that the scavenge tube 300 is centralized in the assembly 100 and is spaced an optimum distance from the base 220 of the separator element 200.

As mentioned above, the separator tank assembly 100 of the present invention includes a generally cylindrical separator element 200, shown in FIG. 2, a separator tank housing 140, a separator tank cover 160, and an adapter 400. Referring to both FIGS. 1 and 2, the separator element 200 has a housing 230 that includes a sidewall 210 and a base 220. The sidewall structure 210 may comprise a perforated outer sleeve 212, a perforated inner sleeve 214, and a separating media 216 located between the outer sleeve 212 and the inner sleeve 214, as shown in FIG. 1. FIG. 1 shows the sidewall structure 210 positioned close to the inner surface of the tank housing 140; however, it will be understood that the sidewall structure 210 of the separator element 200 can be spaced farther from the inner surface of the tank housing 140 than depicted in FIG. 1. Lubricant that is separated from the compressed fluid by the separating media 216 is collected on the base 220.

The separator element 200 also includes the support element 250 which may be permanently mounted to the housing 230. The base 220 and the support element 250 define the upper and lower limits of a separation chamber 150, where separation of the lubricant from the compressed fluid occurs. The scavenge tube 300 is fixed to the support element 250 so that a first end 310 of the scavenge tube 300 is located at a predetermined position relative to the base 220 of the housing 230. In a preferred embodiment, the first end 310 is spaced 1–4 mm from the interior surface 221 of the base 220. In the embodiment of FIGS. 1 and 2, the base 220 is contiguous with the inner sleeve 214; however, it will be understood that the base 220 may be contiguous with the outer sleeve 212. The second end 320 of the scavenge tube 300 extends out of the separation chamber 150 and through the support element 250, where it can be releasably engaged by the adapter 400.

The support element 250 is mounted to the housing 230 so that the scavenge tube 300 remains in a predetermined position relative to the housing 230. In this regard, the support element 250 has a central portion 258 with an aperture. The scavenge tube 300 extends through the aperture in the central portion 258. The support element 250 also has arms 252 that extend away from the central portion 258 to attach to the housing 230. To facilitate mounting of the support element 250 to the housing 230, the housing 230 has an annular mounting section 232. The annular mounting section 232 extends inward from the sidewall structure 210 of the housing 230 and terminates at an inner surface 234. A portion of each of the arms 252 can be mounted to the annular mounting section 232. In particular, the annular mounting section 232 has a top surface 234, or ledge, to which a portion of each arm 252 can be mounted. In addition, the end of each arm 252 preferably abuts the inner surface of the sidewall structure 210 of the housing 230, where the inner surface can be a surface of either the inner sleeve 214 or the outer sleeve 212, depending on the construction of the separator element 200. In the embodiment of FIG. 1, the ends of the arms 252 abut the inner surface of the inner sleeve 212. In addition, the arms 252 of the support element 250 of this embodiment have a bent shape and include a first segment 253 extending out from the central portion 258, a second segment 254 parallel to the first segment 253, and a third intermediate segment 255 that forms the bend between the first and second sections 253, 254. The second segment 254 preferably is mounted to a top surface 234 of the annular mounting section 232.

Figure 5:
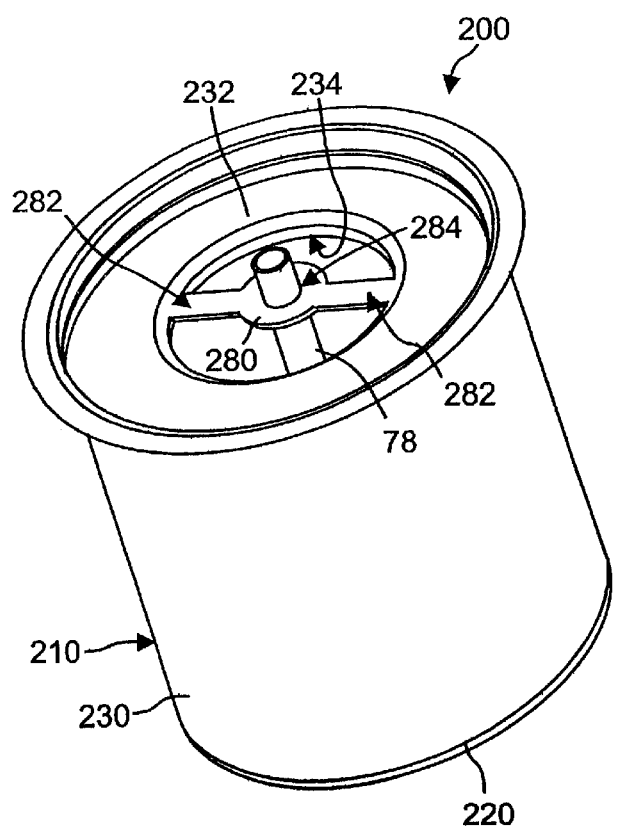
FIG. 5 is a perspective view of an alternative embodiment of the separator element in accordance with the invention.

FIG. 2 shows three arms 252, but it will be understood that the support element 250 could be modified to include only two arms or four or more arms. For example, FIG. 5 shows an embodiment of the separator element having a support element 280 with two arms 282. The separator element 200 has a separator housing 230. Like the separator housing 230 of embodiment of FIG. 2, the separator housing 230 of FIG. 5 includes a mounting section 232. The support element 280 has two arms 282, 283 that meet at a central portion 284. The scavenge tube 300 extends through and is fixed to the central portion 284. The ends of the support arms 282 opposite the central portion 284 are contiguous with an inner surface 234 of the mounting section 232. The support element 280 thus is permanently mounted to the mounting section 232 of the housing 230 and maintains the scavenge tube 300 in a fixed spatial relationship relative to the housing 230.

The inner and outer sleeves 212, 214, the support element 250, the scavenge tube 300, and the mounting section 232 are preferably made of a metal alloy, such as steel, and can be welded together. Alternatively, the support element 250 and the scavenge tube 300 can be made of a plastic material, in which case the support element 250 (with the scavenge tube 300) is press fit into place in the housing 230. The inner surface of the sidewall 210 of the housing 230 can include an annular depression, or separate depressions spaced apart in increments equal to the angular distance between arms 252, such that, when the support element 250 is press fit into the housing 230, the ends of the arms 252 engage the depression(s) to retain the support element 250 in place in the housing 230.

The scavenge tube 300 extends along a longitudinal central axis of the separator element 200, shown as axis A—A in FIG. 1. Because the scavenge tube 300 is centrally located in the separator element 200, the person assembling the separator tank assembly can be assured that the first end 310 of the scavenge tube 300 is properly positioned within the separator element 200, i.e., centered and appropriately spaced from the base 220 of the separator element 200.

The separator element 200 of FIG. 2 is shown in FIG. 1 inside of the separator tank housing 140, which is dimensioned to receive the separator element 200. The tank housing 140 has an outer flange 142. The separator tank cover 160 extends over both the discharge (top) end of the separator element 200 and the outer flange 142. The tank cover 160 includes apertures 162 that correspond to apertures 144 in the outer flange 142 of the tank housing 140. Bolts B or other fasteners can be inserted through the apertures 144, 162 to secure the cover 160 to the tank housing 140.

Like the tank housing 140, the separator element 200 includes an outer flange 260 at its discharge (top) end. This outer flange 260 is dimensioned to be sandwiched between the bottom surface 164 of the cover 160 and the outer flange 142 of the tank housing 140, as shown in FIG. 1. The outer flange 260 of the separator element 200 has a width sufficient to rest on the outer flange 142 of the housing 140, yet not breach the bolt-receiving apertures 144 in the outer flange 142 of the housing 140. When the bolts B are tightened, the tank cover 160 clamps the outer flange 260 into place between the tank cover 160 and the outer flange 142 to retain the separator element 200 in place in the separator tank housing 140. Because the scavenge tube 300 is formed integrally with the separator element 200, the scavenge tube 300 does not need adjustment during assembly of the separator element 200 into the separator tank housing 140.

The separator tank assembly 100 of the present invention also includes an adapter 400. The tank cover 160 has a cover orifice 166 for receipt of the adapter 400. The adapter 400 is threadedly connected within the cover orifice 166. A portion of the exterior surface of the adapter 400 includes threads 405, and the cover 160 includes threads 168 within the cover orifice 166 that correspond to threads 405. It will be apparent that the cover 160 can include other orifices (not shown) for receipt of additional line components of the fluid compressor system.

Figure 3:
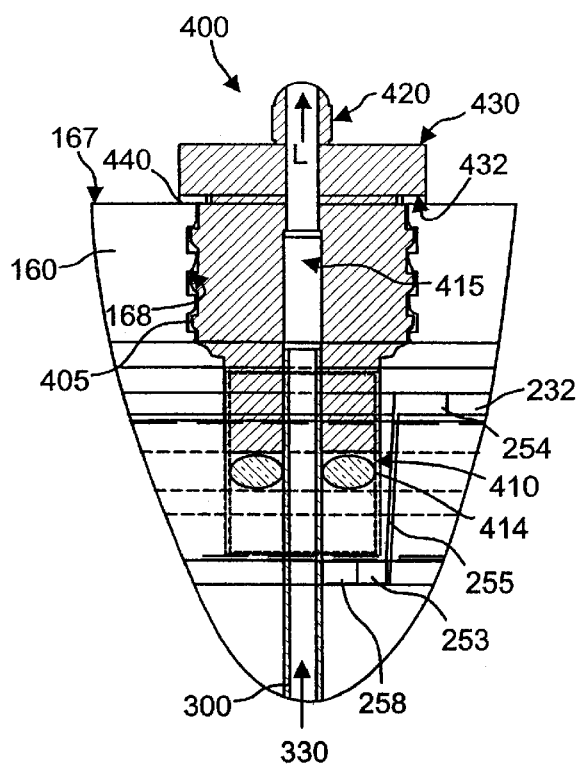
FIG. 3 is an enlarged, side view, in cross section, of an adapter in accordance with the invention.

FIG. 3 shows a first embodiment of the adapter. The adapter 400 has a first section 410 to connect to the second end 320 of the scavenge tube 300 and has a second section 420 to connect to a line component (not shown) of the fluid compression system. In addition, the adapter 400 has an orifice 415 therethrough. The flow passage 330 of the scavenge tube 300 and the adapter orifice 415 communicate so that lubricant in the scavenge tube 300 can pass through the adapter 400 in the direction of arrow L to the line component connected to the adapter's second section 420.

The first section 410 of the adapter 400 includes a seal element 414, such as an O-ring, in the adapter orifice 415. The O-ring 414 engages the outer surface 320 of the scavenge tube 300. In this regard, the first section 410 of the adapter 400 forms a push joint for engagement with the second end 320 of the scavenge tube 300. The scavenge tube 300 pushes up through the O-ring seal 414 carried in the adapter orifice 415. The O-ring of the adapter 400 creates a fluid-tight seal around the second end 320 of the scavenge tube 300 so that lubricant does not leak between the outer surface of the scavenge tube 300 and the inner surface of the adapter orifice 415. Accordingly, lubricant can be piped through the scavenge tube 300 to other line components of the fluid compressor system without leakage.

The adapter 400 also can have an enlarged section 430 between the first and second sections 410, 420. The enlarged section 430 has a bottom surface 432. A sealing ring 440 is preferably positioned between the top surface 167 of the cover 160 and the bottom surface 432 of the enlarged portion 430 of the adapter 160. The sealing ring 440 prevents leakage of fluid or lubricant between the outer surface of the adapter 400 and the inner surface of the cover orifice 415. The adapter 400 may include a check valve and an orifice fitting to control fluid flow from the scavenge tube through the adapter to other line components of the fluid compression system. This embodiment of the adapter is shown in FIG. 4.

Figure 4:
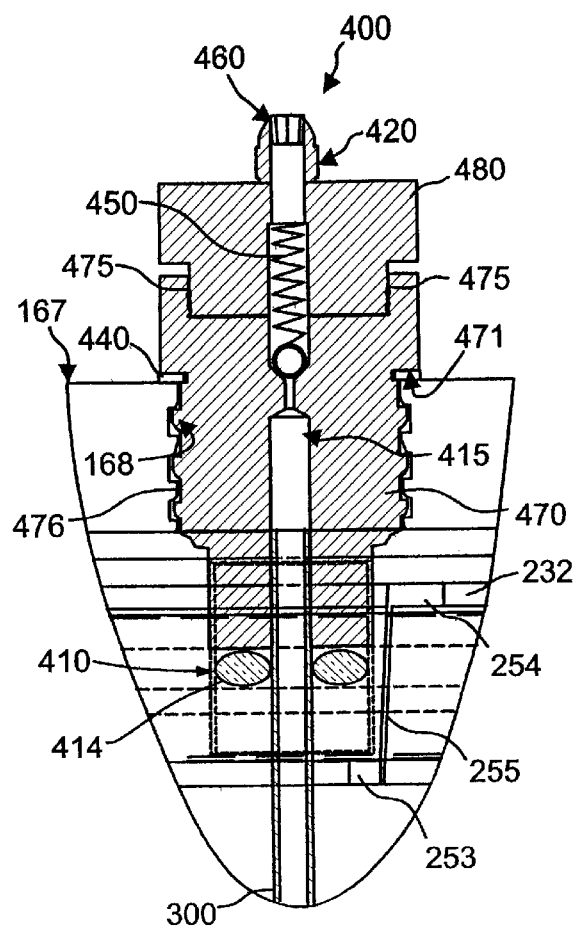
FIG. 4 is an enlarged, side view, in cross section, of an alternative embodiment of the adapter in accordance with the invention.

As shown in FIG. 4 an alternative adapter 400 may be provided. This adapter 400 includes two features in addition to seal 414. First, the adapter 400 includes a check valve 450 positioned in the adapter orifice 415. The check valve 450 is positioned between first section 410 and second section 420. Like the embodiment of FIG. 3, the first section 410 connects to the second end 320 of the scavenge tube 300, and the second section 420 connects to a line component (not shown) of the fluid compression system. The check valve 450 restricts fluid flow in a direction opposite arrow L to prevent lubricant from flowing back into separator element 12. Second, the adapter 400 includes a fitting 460 positioned in the adapter orifice 415 in the second section 420 of the adapter 400. The fitting 460 restricts fluid flow in the direction of arrow L. The fitting 460 can be press fit into the adapter orifice 415 and can be made of brass or steel, for example. Alternatively, the second section 420 of the adapter 400 can be machined to form the fitting 460 in the adapter orifice 415. The fitting 460 preferably has a tapered channel that tapers toward the first section 410.

The adapter 400 of FIG. 4 thus integrates three functions into one: providing a seal 414 between the scavenge tube 300 and the cover 160, providing a check valve 450 to restrict lubricant flow in a direction opposite arrow L, and providing a fitting 460 to restrict lubricant flow in the direction of arrow L.

The adapter shown in FIG. 3 is a one-piece adapter. The alternative adapter 400 shown in FIG. 4 is a two-piece adapter, although it will be understood that the adapter shown in FIG. 4 also can be made of one-piece. In the two-piece embodiment, the adapter has a first piece 470 and a second piece 480. The first piece 470 includes the first section 410, and the second piece 480 includes the second section 420. The first and second pieces 470, 480 can be press fit together or can be threadedly engaged at engagement surfaces 475. The first piece 470 includes a lower surface 471 that can cooperate with top surface 167 of the cover 160 to sandwich a sealing ring 440 therebetween. In this embodiment, the sealing ring 440 prevents leakage of fluid or lubricant between the outer surface of the adapter 400 and the inner surface of the cover orifice 415.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A separator element for placement in a separator tank of a fluid compression system, said separator element comprising:
   a housing having a base and a sidewall structure;
   a support element mounted to the housing; and
   a scavenge tube fixed to the support element so that a first end of the scavenge tube is located at a predetermined position relative to the base of the housing and a second end of the scavenge tube extends from the housing.

2. The separator element according to claim 1, wherein the housing has a longitudinal central axis, and the scavenge element is fixed to the support element and positioned along the longitudinal central axis.

3. The separator element according to claim 2, wherein the support element has a central portion to which the scavenge tube is fixed and has a pair of arms attached to the housing and extending from the central portion.

4. The separator element according to claim 3, wherein the housing has a mounting section extending generally inward toward the central axis, and wherein the pair of arms are mounted to the mounting section.

5. The separator element according to claim 4, wherein the housing is generally cylindrical, and the mounting section forms an annular shelf along an inside circumference of the housing generally perpendicular to the longitudinal central axis of the housing.

6. The separator element according to claim 5 wherein the annular shelf has a top surface facing away from the base of the housing, and wherein each of the pair of arms is mounted to the top surface of the annular shelf.

7. A separator element according to claim 1, wherein the sidewall structure comprises a perforated outer sleeve, a perforated inner sleeve, and a separating media located between the outer sleeve and the inner sleeve.

8. A separator element according to claim 7, wherein the support element has a central portion to which the scavenge tube is fixed and has a pair of arms extending from the central portion to attach to the housing, and wherein the pair of arms extend to an inner surface of one of the outer sleeve and the inner sleeve.

9. A separator tank assembly for use in a fluid compression system, the separator tank comprising:
   a separator element having a base, a support element mounted to the separator element, and a scavenge tube having a first end and a second end, the scavenge tube being fixed to the support element so that the first end of the scavenge tube is located at a predetermined position relative to the base of the separator element and the second end of the scavenge tube extends from the separator element:
   a tank housing dimensioned to receive the separator element;
   a tank cover configured to attach to the tank housing, the tank cover having a cover orifice therethrough;
   and an adapter extending through the cover orifice, the adapter having a first section configured to automatically sealingly engage the second end of the scavenge tube and a second section to connect to the fluid compression system.

10. The separator tank assembly according to claim 9, wherein the first section of the adapter includes a seal element to engage an outer surface of the scavenge tube.

11. The separator tank assembly according to claim 10, wherein the seal element is an O-ring seal.

12. The separator tank assembly according to claim 9, wherein the scavenge tube has a flow passage and the adapter has an adapter orifice extending therethrough that communicates with the flow passage when the adapter is attached to the scavenge tube.

13. The separator tank assembly according to claim 12, wherein the adapter includes a valve positioned in the adapter orifice to restrict fluid flow in a direction from the second section to the first section.

14. The separator tank assembly according to claim 12, further comprising a fitting positioned in the adapter orifice to restrict fluid flow through the orifice.

15. The separator tank assembly according to claim 14, wherein the fitting is press fit in the adapter orifice.

16. The separator tank assembly according to claim 14, wherein the fitting is integrally formed with the second section of the adapter.

17. The separator tank assembly according to claim 14, wherein the fitting has a tapered channel that tapers toward the first section of the adapter.

18. The separator tank assembly according to claim 9, wherein the adapter is threaded into the cover orifice.

19. The separator tank assembly according to claim 9, wherein the separator element has a top end flange extending outward to be positioned between an outer flange of the tank housing and the tank cover.

20. The separator tank assembly according to claim 9, wherein the adapter is one-piece.

21. The separator tank assembly according to claim 9, wherein the adapter has a first piece that includes the first section of the adapter and a second piece that includes the second section of the adapter.

22. The separator tank assembly according to claim 21, wherein the first and second pieces are threadedly connected together.

23. A method of assembling at least a portion of a separator tank of a fluid compression system, the method comprising the steps of:
   providing a separator element housing having a base surface and a sidewall structure;

providing a support element having an outer surface and an inner surface;

securing a scavenge tube to the support element such that a first portion of the tube extends above the support element outer surface and a second portion of the tube extends below the inner surface a given distance X; and engaging the support element to the separator element housing such that the scavenge tube second portion extends into the housing and the support element inner surface is spaced from the base surface a distance equal to X plus a desired clearance distance.

24. The method according to claim 23 further comprising the steps of:

providing a separator tank housing having a substantially open end; and positioning the separator element housing in the tank housing such that the scavenge tube first portion is adjacent the tank housing open end.

25. The method according to claim 24 further comprising the steps of:

providing a tank cover configured to substantially close the tank open end, the tank cover including an adapter extending therethrough, the adapter including an inlet with a sealing element thereabout; and positioning the tank cover over the tank open end such that the adapter inlet automatically sealingly engages the scavenge tube first portion.

26. The method according to claim 25 further comprising the step of:

providing a valve in the adapter to restrict flow in a direction from the scavenge tube out of the tank housing.

* * * * *